United States Patent [19]

Widlak

[11] Patent Number: 4,702,424

[45] Date of Patent: Oct. 27, 1987

[54] DEVICE FOR CHIPPING WOOD-LIKE MATERIAL

[75] Inventor: Marinus C. M. Widlak, Knegsel, Netherlands

[73] Assignee: Autobedrijf de Beemd, Eindhoven, Netherlands

[21] Appl. No.: 27,063

[22] Filed: Mar. 17, 1987

Related U.S. Application Data

[63] Continuation of Ser. No. 645,090, Aug. 28, 1984, abandoned.

[30] Foreign Application Priority Data

Sep. 7, 1983 [NL] Netherlands ......................... 8303099

[51] Int. Cl.[4] ......................... B27C 1/00; A01D 55/00

[52] U.S. Cl. ................................. 241/101.7; 144/174; 144/230; 241/243; 241/294

[58] Field of Search ................. 241/101 B, 101.7, 242, 241/243, 294; 144/3 R, 162 R, 172, 173, 174, 218, 230

[56] References Cited

U.S. PATENT DOCUMENTS

| | | | |
|---|---|---|---|
| 1,785,151 | 12/1930 | Sprague . | |
| 2,584,262 | 2/1952 | Lamater, Sr. . | |
| 2,634,062 | 4/1953 | Forman | 144/172 UX |
| 3,017,912 | 1/1962 | Sybertz et al. . | |
| 3,112,925 | 12/1963 | Hammer . | |
| 3,216,470 | 11/1965 | Nilsson | 144/172 X |
| 3,454,234 | 7/1969 | Schoeppner | 144/172 X |
| 4,077,450 | 3/1978 | Ackerman | 144/172 |
| 4,353,400 | 10/1982 | Flanigan et al. | 144/230 |
| 4,432,499 | 2/1984 | Henkensiefken et al. | 241/101 B |
| 4,442,877 | 4/1984 | Uitermarkt | 144/172 |
| 4,538,655 | 9/1985 | Berkeley | 144/230 |

FOREIGN PATENT DOCUMENTS

| | | | |
|---|---|---|---|
| 875168 | 3/1979 | Belgium . | |
| 781759 | 4/1968 | Canada | 144/162 R |
| 0024993 | 3/1981 | European Pat. Off. . | |
| 843974 | 7/1952 | Fed. Rep. of Germany . | |
| 848703 | 9/1952 | Fed. Rep. of Germany . | |
| 946019 | 7/1956 | Fed. Rep. of Germany . | |
| 1021565 | 12/1957 | Fed. Rep. of Germany . | |
| 1059649 | 6/1959 | Fed. Rep. of Germany . | |
| 1653093 | 9/1971 | Fed. Rep. of Germany . | |
| 2332108 | 6/1977 | France . | |
| 80538 | 2/1956 | Netherlands . | |

*Primary Examiner*—W. Donald Bray

*Attorney, Agent, or Firm*—Cushman, Darby & Cushman

[57] ABSTRACT

A device for chipping wood with the aide of a combination of a cylinder rotatable about its longitudinal axis and provided with one or more protruding, longitudinal knives and a counterknife disposed along side the cylinder wherein along at least ¾ of its length, the cylinder has a surface with transverse grooves and, viewed in the direction of rotation, in front of each knife, a slot for temporarily collecting and conducting away the chipped wood.

10 Claims, 4 Drawing Figures

DEVICE FOR CHIPPING WOOD-LIKE MATERIAL

Figure 1:
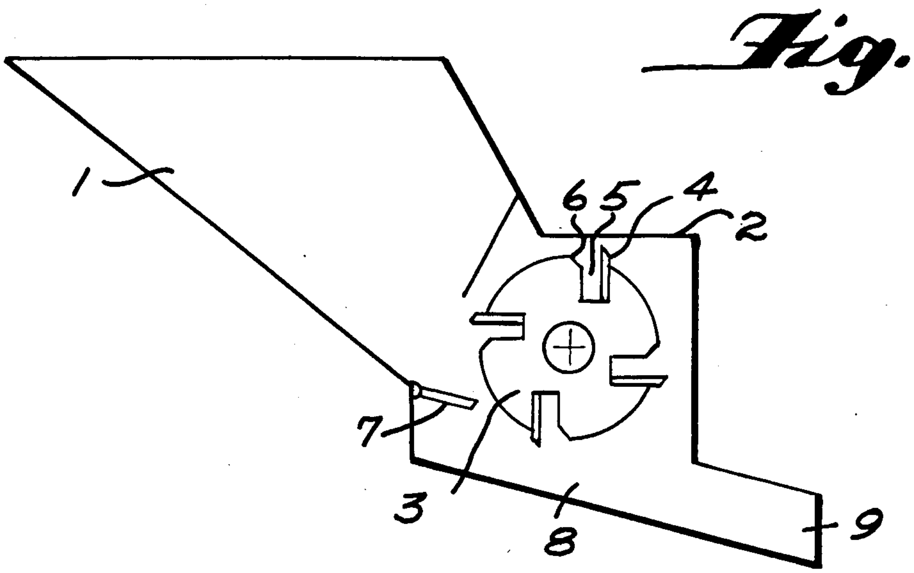

This is a continuation of application Ser. No. 645,090, filed Aug. 28, 1984, which was abandoned upon the filing hereof.

The invention relates to a device for chipping wood using a rotatable cylinder provided with protruding knives and a counter-knife arranged alongside the cylinder.

Devices of the kind set forth are known in the art. Usually they comprise a filling funnel in which the counter-knife is disposed on the underside whilst the rotatable cylinder with its protruding knives cuts the wood fed into the filling funnel, for example, pruned wood, into small parts, termed hereinafter chips. The chips obtained may be used for many purposes, for example, for producing particled board, but they may also be used for a ground cover with plants, where they are converted into a nutrient for the plants. Particularly in using such a device for working pruned wood problems arise due to the various dimensions of length and thickness of the wood introduced into the filling funnel. These problems generally become manifest in jamming of the rotatable knife cylinder. Of course, a very strong engine may be used for driving the cylinder, but this is very expensive and for a large part of the time of operation the power is much too high. A further inconvenience is that the knives have each time to be adjusted in accordance with the thickness of the wood to be worked.

The invention has for its object to avoid the above-mentioned disadvantages and to provide other advantages. A further object of the invention is to provide an apparatus suitable for pruning with the aid of automatically operating pruning knives in conjunction with the above-mentioned chipper.

A device embodying the invention for chipping wood with the aid of the combination of a cylinder rotatable about its longitudinal axis and provided with one or more protruding, elongate knives and a counter-knife arranged alongside the cylinder is characterized in that over at least three quarters of its length the cylinder has a surface with transverse grooves and, viewed in the direction of rotation, in front of each knife a slot for temporarily receiving and conducting away the chipped wood.

Owing to the transverse grooves in the cylinder thicker pieces of wood, which in particular cause the aforesaid jamming of the device, are now chipped without any difficulty, since they are cut, so to say, spot after spot, even if they extend occasionally in the direction of length of the cylinder with the knives.

The slots in front of each knife are necessary because otherwise the chipped wood would readily result in jamming, if it accumulates between the knives of the cylinder and the counter-knife. The slots pick up the chipped material and conduct it away in the direction of rotation. It may be collected there in a trough for further transport. As a matter of course, it may, as an alternative, be sprayed out of the device to the desired place, for example, underneath plants.

Preferably the slots are parallal to the axis of the cylinder. As an alternative, however, helical slots might be used. The knives and also the counter-knife have to match this configuration. Such a structure is much more expensive than a structure with straight slots parallel to the axis of the cylinder provided with the knives.

The knives are preferably disposed in the slots, that is to say, on the hindmost side of the slots. The front side of the slots is preferably bevelled in order to enlarge the access to the knives.

Where reference is made here and hereinafter to "front side" this is to be understood to mean that side which first passes by a given point in the direction of rotation of the cylinder. The "hindmost side" means the opposite side.

In a cross-section of the cylinder the slots preferably extend tangentially. This results in an improved cutting effect, whilst such a construction can be more readily made.

Preferably the transverse grooves constitute closed circles in planes at right angles to the axis of the cylinder provided with the knives, since this results in a structurally simple unit, whilst the effect of the chipper is at the optimum.

The sectional area of the grooves in a plane parallel to the axis of the cylinder may have different shapes, for example, triangular, semi-circular or elliptical. However, the transverse grooves are preferably formed so that in common they exhibit a wave line along the line of intersection with the sides of the slots, since practice has shown that the maximum speed of the chipper can be used, whilst substantially any jamming is avoided.

The knives are fastened in the slots of the cylinder preferably by clamping. For this purpose clamping fillets are used, which have bolts screwed tight between the clamping fillet and the front side of the slot. In this way a construction is obtained in which release and insertion of the knives can be readily carried out. The height of the protruding parts of the knives is preferably set by providing set bolts in the bottom of the slots. When these set bolts are arranged at the end of a knife, they can be readily set higher and lower in the slot by means of a tool, for example, a hollow screw. The knife is pressed onto these bolts and fixed in place by means of transverse bolts.

In a further advantageous embodiment holes are made in the bottom and the wall of the slots in the direction in which the knife extends in the slot, in which holes small springs are arranged. These springs urge the knife to the outside In setting the height of the knives with respect to the counter-knife the knife is pressed down as far as is necessary and the transverse clamping bolts are fixed in place. Also in this case it is advantageous to provide set bolts at the ends of the knives. These set bolts, however, do not serve for setting the height of the knives but they serve as stops, since during the rotation of the chipper heavy forces are exerted on the knives in the direction towards the bottom of the slot. The transverse bolts in the slot are, in fact, capable of absorbing the major part of these foces, but it has been found that in the course of time a displacement of the knives in the slots may nevertheless occur. By the set bolts below the knife such displacement is practically excluded.

The place of the counter-knife, like in the known devices, is at the bottom of the filling funnel for the wood to be chipped. In practice it has been found that chipping is best performed when the surface of the counter-knife is at an angle of 100° to 120° to the plane going through the axis of the cylinder and the front side of the counter-knife.

A further improvement can be obtained by using a cylinder surface extending nose-like at least at two spots of the cross-section of the cylinder surface and a slot between two neighbouring grooves over the bevelled side, that is to say, in rearward direction. It is thus ensured that even branches of a section such that the risk of jamming of the knife cylinder would be highest because, despite the grooved surface, they would get between the knives of the cylinder and the counter-knife remain at a slightly higher level. Then they are, so to say, abraded. This problem will only occur in practice when accidentally a branch drops in a direction parallel to the axis of the cylinder in the funnel on the counter-knife.

As stated above, the chipped wood can be collected in a trough or it may be conducted away through an outlet pipe. Preferably this outlet pipe, which is open on the side remote from the filling funnel, is arranged movably in a vertical direction. By setting the outlet pipe higher or lower the chips can then be ejected more or less further.

The cylinder provided with the knives is preferably made from metal, for example, tool steel. The cylinder need not be completely solid, it may be built up from parts having an internal supporting structure and having a cylindrical surface. As a matter of course, this surface should have sufficient thickness for making the grooves and slots in it.

A device of the kind described above can be perfectly combined with a pruning device operating with pneumatically operating pruning knives. The pruned wood can then be directly introduced into the filling funnel of the chipper. An apparatus of such construction comprises a device of the kind described above for chipping wood arranged on a frame and is characterized in that it furthermore comprises a driving engine for the chipping device and an air compressor for actuating the pruning knives, which compressor may also be driven by the same engine. In practice it has been found that the use of such an apparatus has very many advantages over the methods hitherto carried out in which pneumatical pruning knives and a separate chipper are employed, since then the pruned wood need no longer be transported to the filling funnel of the chipper. The chipped wood can be sprayed underneath the plants at the very place of the apparatus whilst very long hoses for actuating the pruning knives are avoided.

It is known that a compressor practically always needs a storage tank for a given amount of air under the desired pressure. In a particular embodiment of the apparatus described above comprising a combination of a chipper, a driving engine and a compressor the frame carrying these parts is made from tubes, which are used as a storage tank for compressed air.

Figure 4:
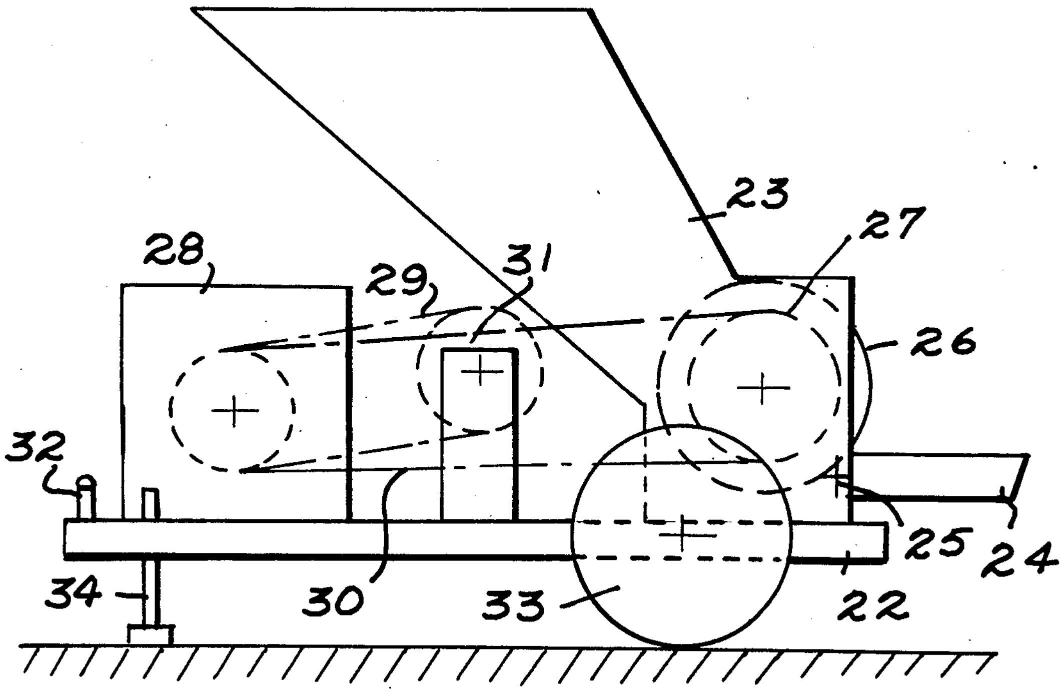
Figure 2:
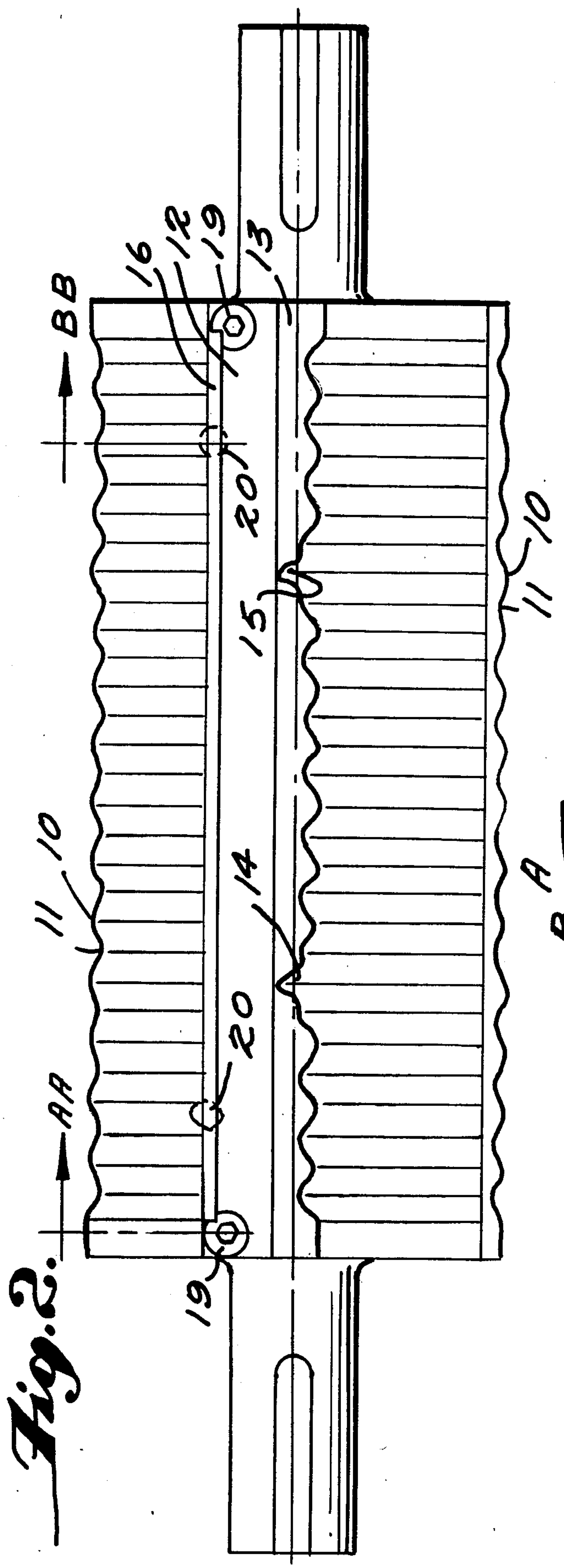
Figure 3:
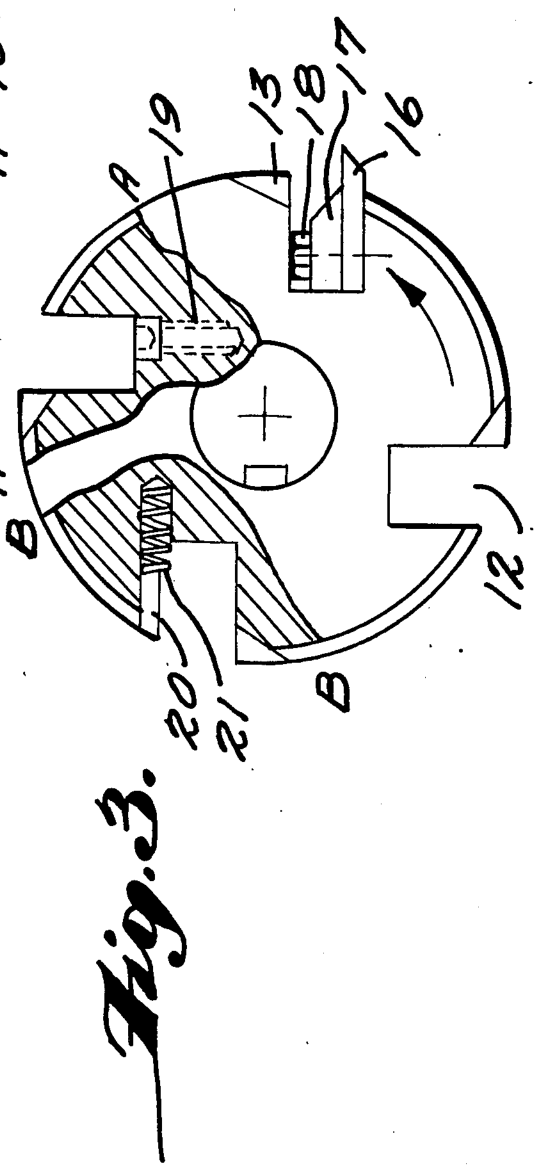

The invention will now be described with reference to a drawing of an embodiment of a device in accordance with the invention in which FIG. 1 is a schematic cross-sectional view of such a device, FIG. 2 is a plan view of a cylinder provided with knives, FIG. 3 is a detailed cross-sectional view of the cylinder of FIG. 2 and FIG. 4 is a schematic elevational view of an apparatus comprising the combination of a wood chipper, a driving engine and a compressor arranged on a frame.

Referring to FIG. 1 reference numeral 1 designates a filling funnel receiving the wood to be chipped. Adjoined to this filling funnel the device comprises a part 2 comprising the cylinder with the elongate knives. This cylinder is designated by 3 and the elongate knives by 4. From the Figure it appears that these longitudinal knives 4 are arranged on the rear side of a slot designated by 5. In this slot they are rigidly fastened in a manner to be described in detail with reference to FIGS. 2 and 3. The slots are bevelled on the front side at 6. On the underside of the funnel is arranged a counter-knife 7, which may be tiltable, at an angle of about 30° to the horizontal. The space enclosed by the part 2 communicates with a space 8 for collecting the chipped wood. On the right-hand side of the space 8 is arranged an outlet spout 9. During rotation of the cylinder 3 in the direction indicated by an arrow the knives 4 pass by the counter-knife 7 at a short distance. Before the cutting edges of the knives 4 pass by the counter-knife wood contained in the funnel 1 is captured by the slots 5 with the bevelled sides 6. The distance between the edge of the counter-knife and the cylinder 3 is, however, so small that the wood cannot pass between the counter-knife 7 and the cylinder 3, in particular, when the wood is fairly long and is located in the funnel in a direction more or less normal to the cylinder 3. During the rotation of the cylinder 3 the knife 4 thus cuts into the wood and severs small chips from it. These chips are collected in the slots 5 and conducted away to the space 8, where they can flow out through the outlet 9.

When the surface of the cylinder 3 between the slots is smooth, it may occur, as has been found in practice, that wood arriving from the filling funnel 1 squeezes between the cylinder 3 and the counter-knife 7. As a result the rotation of the cylinder 3 may be blocked. In order to avoid this the surface of the cylinder 3 is not smooth but has transverse grooves such that, as will be apparent from FIG. 2, a plane of intersection parallel to the longitudinal axis of the cylinder 3 exhibits a wave line 10. In this embodiment the grooves 11 are at right angles to the axis of the cylinder and have a circular shape. As stated above, this is not necessary, since the grooves might be provided in a helical configuration or be at a given angle to the axis of the cylinder 3. For structural reasons the embodiment shown can be obtained in a very simple manner, so that it is cheap. During the rotation of the cylinder the peaks of the surface located between the grooves are, of course, at the smallest distance from the counter-knife. The grooves themselves are at a slightly larger distance so that blocking of the rotation of the cylinder is practically completely avoided. The bevelled side of the slot 12 is designated by 13. From the Figure it will be seen that at the places 14 and 15 the grooved surface has a slightly different shape so that on the bevelled side noses are formed. At this place the bevelled side is higher than at the further parts. These noses prevent wood getting accidentally in the direction of length of the cylinder and having a given minimum size from blocking the cylinder, since this wood cannot sink into the groove. It will be slowly abrazed by the knives. Although the drawing shows only two noses it is, of course, possible to provide more noses, which will certainly be done when there is a risk of short wood getting between the noses and blocking the cylinder provided with the knives. If the wood is very short there will be no difficulty when the driving force of the cylinder has the normal value.

In FIG. 3 corresponding parts are designated by the same reference numerals as in FIG. 2. This Figure shows only one knife, which is designated by 16. The knife bears on the rear side of the slot 12 and is clamped therein with the aid of a clamping fillet 17, which is pressed by bolts 18 against the front side of the slot. By screwing the bolts 18 in and out the knife can be fixed and released respectively. Although these bolts can transfer a very heavy force to the clamping fillet 17 and hence to the knife 16, it has been found in practice that under certain conditions and after long use the knife does no longer occupy its correct position. Initially the knives are, of course, set opposite the counter-knife at the desired small distance. In the case of new knives they may bear on the bottom of the slot 12. In the case of wear, requiring grinding of the knives, which are thus shortened, the knives have to be readjusted and in this case some space is formed below the knives in the slots. By tightening the bolts 18 the clamping effect may become very satisfactory, but practice showed that after some time a displacement of the knives in the direction towards the bottom of the slot nevertheless occurred. Then the cutting effect is, of course, no longer satisfying and a correct readjustment of the counter-knife is not possible. In order to avoid this disadvantage, in a particular embodiment of the invention shown in FIGS. 2 and 3, set bolts 19 are arranged at the ends of the knives in the bottom of the slot. These set bolts are accessible along the knives, as will be apparent from FIG. 2. They may be formed, for example, by so-called hollow screws. In setting the knives they will be fixed at the correct distance by means of the bolts 18, after which the set bolts 19 will be screwed towards the underside of the knives to an extent such that they are in contact therewith.

In order to facilitate setting of the knives the cylinder has holes 20. These holes are located just, at least partly below the knives. Compression springs 21 are arranged in said holes. These springs urge the knife to the outer side so that in setting force need be exerted into one direction.

FIG. 4 is a schematic side elevation of an apparatus for pruning with the aid of pneumatically operating pruning shears and comprising a device for chipping wood of the kind described above. The frame 22 carries the chipper 23 having an outlet spout 24 at the front. In a preferred embodiment this spout 24 may be rotatable about a shaft 25. Reference numeral 26 designates a flywheel fastened to the cylinder 27 provided with the knives. This ensures a regular rotation of the cylinder.

Behind the chipper 23 the frame carries a driving engine 28. By means of the belts 29 and 30 this engine drives a compressor 31 and the cylinder 27. The compressor supplies the compressed air for actuating the pneumatic pruning shears. Since by nature the shears are intermittently opened and closed, it is necessary to provide a storage vessel for compressed air. In a particularly advantageous embodiment of the apparatus shown in FIG. 4 the frame 22 consists of tubes, with which the compressor communicates and which serve as a compressed air store. The pruning shears may be connected with one or more nipples 32.

At the front the frame 22 bears on wheels 33 and on the rear side on one or more legs 34, which may be adjustable in a direction of height. The great advantage of an apparatus as shown in FIG. 4 is that the prunings are chipped at the very place of pruning. Therefore, no transport need take place from the place of pruning to the place of the chipper. Owing to the compact structure of the apparatus the assembly can be disposed closely to the place of pruning. This is particularly important when narrow strips along busy traffic roads have to be pruned. In these strips it is easy to find a place for the compact apparatus. As stated above, the chipped material can be directly sprayed underneath the plants. As a matter of course, controls are provided for switching the compressor on and off in accordance with the demand for compressed air and the pressure in the storage vessel.

Since pruning and chipping usually alternate, in particular when only one person controls the apparatus, the compressor and the chipper are usually operating alternately. Therefore, the engine need not constantly supply its full power so that energy is saved. Moreover, in general a smaller engine will be sufficient.

By the transversal grooves in the surface of the cylinder relatively thin branches are exclusively cut through to lengths, which are also determined by the distances of the knives. The device according to the invention on the other hand cuts thin chips from relatively thick branches. It appears that by the special construction of the cutter according to the invention, the device can independently of the thickness of the wood fed into it always run at its maximum capacity.

I claim:

1. A device for chipping wood chiefly in the form of branches comprising: a housing, an elongated cylinder rotatable in a selected direction about its longitudinal axis, a longitudinally extending knife disposed on said cylinder and a counter-knife mounted on said housing adjacent said cylinder and extending parallel to the longitudinal axis of said cylinder;

said cylinder having a peripheral surface, said surface having a plurality of circumferentially extending grooves thereon with said grooves being spaced along said longitudinal axis of said cylinder;

said cylinder having a slot means formed therein and extending parallel to said longitudinal axis, said slot means being located, with respect to said direction of rotation, in advance of said knife for temporarily collecting and conducting away the chipped wood, said knife having a portion thereof disposed in said slot;

said slot having, with respect to said direction of rotation, a bevelled leading edge, said leading edge having, adjacent said peripheral surface of said cylinder, at least two nose-like projections for breaking up pieces of wood, said projections being spaced apart along said longitudinal axis of said cylinder.

2. A device as claimed in claim 1 wherein a plurality of knives are provided each having a said slot in front thereof and in a cross-sectional view of the cylinder said slots extending tangentially.

3. A device as claimed in claim 2 wherein each knife is disposed in a respective slot, each slot having opposite sides and each knife being clamped in a said respective slot with a fillet and a bolt extending between said opposite sides of said respective slot.

4. A device as claimed in claim 2, wherein each slot has a bottom surface which is formed with a recessed opening in which is disposed a spring for engaging a portion of a said knife carried in a said slot.

5. A device as claimed in claim 1 wherein the transverse grooves form closed circles in planes at right angles to the axis of the cylinder.

6. A device as claimed in claim 5 wherein the transverse grooves have a shape such that in common on the line of intersection with the sides of the slots they exhibit a wave line.

7. Apparatus comprising a frame supporting a chipping device according to claim 1, an air compressor and an engine for driving the chipping device and the air compressor supported on said frame, said frame being constructed from tubes communicating with said air compressor and constituting a storage tank for compressed air and provided with at least one nipple.

8. A device as claimed in claim 1 wherein said housing includes a counter-knife having a front edge and which extends at an angle of between 100° and 120° to a plane passing through the axis of said cylinder and said front edge, said housing having a filling funnel having a bottom adjacent said counter-knife.

9. A device as claimed in claim 8 wherein the wood chips are collected in an outlet pipe, which is open on the side remote from the filling funnel.

10. A device as claimed in claim 9 wherein the outlet pipe is movable in a vertical direction.

* * * * *